(12) United States Patent
Chen

(10) Patent No.: US 6,859,460 B1
(45) Date of Patent: Feb. 22, 2005

(54) SYSTEM AND METHOD FOR PROVIDING MULTIMEDIA JITTER BUFFER ADJUSTMENT FOR PACKET-SWITCHED NETWORKS

(75) Inventor: Michael C. Chen, San Jose, CA (US)

(73) Assignee: Cisco Technology, Inc., San Jose, CA (US)

(*) Notice: Subject to any disclaimer, the term of this patent is extended or adjusted under 35 U.S.C. 154(b) by 841 days.

(21) Appl. No.: 09/584,120

(22) Filed: May 31, 2000

Related U.S. Application Data

(60) Provisional application No. 60/161,168, filed on Oct. 22, 1999.

(51) Int. Cl.[7] ............................................. H04L 12/28
(52) U.S. Cl. ....................... 370/412; 370/516; 370/519; 370/468
(58) Field of Search ................................ 370/412, 468, 370/252, 516, 303, 464, 503, 509, 519, 521, 394, 470–474; 709/231, 230, 228, 214

(56) References Cited

U.S. PATENT DOCUMENTS

| | | | |
|---|---|---|---|
| 4,270,183 A | | 5/1981 | Robinson et al. |
| 4,742,446 A | | 5/1988 | Morioka et al. |
| 5,159,291 A | | 10/1992 | Ghoshal |
| 5,640,388 A | * | 6/1997 | Woodhead et al. ......... 370/468 |
| 6,157,653 A | * | 12/2000 | Kline et al. ................. 370/412 |
| 6,175,871 B1 | * | 1/2001 | Schuster et al. ............ 709/231 |
| 6,226,290 B1 | * | 5/2001 | Salett et al. ................ 370/389 |
| 6,282,196 B1 | * | 8/2001 | Lyons et al. ................ 370/394 |
| 6,327,274 B1 | * | 12/2001 | Ravikanth ................... 370/516 |
| 6,360,271 B1 | * | 3/2002 | Schuster et al. ............ 709/231 |
| 6,377,931 B1 | * | 4/2002 | Shlomot ..................... 704/503 |
| 6,434,606 B1 | * | 8/2002 | Borella et al. ............. 709/214 |
| 6,452,950 B1 | * | 9/2002 | Ohlsson et al. ............. 370/516 |

OTHER PUBLICATIONS

Boger, Yuval, "Fine–tuning Voice over Packet Services," available by RADCOM Academy at web site, http://www.protocols.com/papers/voip2.htm, Aug. 2000.

Rowe, Martin, "Measure VoIP Networks for Jitter and Loss," *Test and Measurement World*, Dec. 1999 (also available at http://www.tmworld.com/articles/12_1999_VoIP.htm. Aug. 2000).

* cited by examiner

*Primary Examiner*—Chi Pham
*Assistant Examiner*—Alexander O. Boakye
(74) *Attorney, Agent, or Firm*—Baker Botts L.L.P.

(57) ABSTRACT

A system and method is disclosed for providing dynamic multimedia jitter buffer adjustment for packet-switched networks. The system temporarily stores an amount of incoming data, which is dynamically adjustable, for an amount of time before sending the data out in a more even stream. The system includes a decoder clock, a jitter buffer, a network jitter statistics collector, and a jitter buffer controller. The decoder clock indicates the arrival-time of the data at the system, while the network jitter statistics collector collects the playback-time of that data. By comparing the arrival-time and the playback-time, the jitter buffer controller determines whether the data arrived on schedule. Accordingly, the depth of the jitter buffer can be adjusted to accommodate the late or early arriving data.

35 Claims, 9 Drawing Sheets

| PARAMETER | FIXED DELAY | VARIABLE DELAY |
|---|---|---|
| CODEC (G.729) | 25 msec | |
| Packetization | Included in CODEC | |
| Queuing delay | | Depends on uplink |
| Network delay | 50 msec | Depends on network load |
| Jitter buffer | 50 msec | |
| Total | 125 msec | |

FIG. 6

| RECEIVED FRAME | ARRIVAL-TIME OF FRAME | PLAYBACK-TIME OF FRAME | TIME FRAME WAS LATE (msec) |
|---|---|---|---|
| 1 | Time 100 | Time 100 | 0 msec |
| 2 | Time 220 | Time 130 | 90 msec |
| 3 | Time 160 | Time 160 | 0 msec |
| 4 | Time 190 | Time 190 | 0 msec |
| 5 | Time 250 | Time 220 | 30 msec |
| ... | ... | ... | ... |

SYSTEM AND METHOD FOR PROVIDING MULTIMEDIA JITTER BUFFER ADJUSTMENT FOR PACKET-SWITCHED NETWORKS

RELATED APPLICATIONS

This application claims priority to U.S. application Ser. No. 60/161,168, filed on Oct. 22, 1999, the entire contents of which are incorporated herein by reference.

BACKGROUND OF THE INVENTION

1. Field of the Invention

The invention relates to a system and method for providing multimedia dynamic jitter buffer adjustment over packet-switched networks.

2. Brief Description of the Related Art

Networks carry three types of information: voice, video, and data. Historically, these different forms of information have been transported over different networks. Specifically, the telephone network delivered voice information; private corporate networks delivered data information; and broadcast networks delivered video information. Each service was provided by a specific form of infrastructure—the telephone network used copper wires to reach subscribers, broadcast television used the airwaves, cable television used coaxial cable, and so forth.

With advances in technology, the different forms of information can now be carried by any delivery platform. For example, telephony services (i.e., voice and facsimile) and video services can both be transported over data networks, such as the Internet.

"Internet telephony" refers to the transfer of voice information using the Internet protocol (IP) of the TCP/IP or UDP/IP protocol suite. Internet telephony uses the Internet to simulate a telephone connection between two Internet users and to bypass the local exchange carriers' and interexchange carrier's telephone networks. Internet telephony works by converting voices into data which can be compressed and split into packets. These data packets are sent over the Internet like any other packets and reassembled as audio output at the receiving end. The ubiquitous nature of the Internet allows a user to complete such Internet telephone connections to many countries around the world. Accordingly, by using the Internet to provide telephony services, the user can avoid paying per-minute toll charges assessed by the user's local exchange carrier and/or interexchange carrier. Rather, the user is subject to only his or her local Internet connection fees. The result may be considerable savings when compared to international telephone rates.

In addition, the Internet utilizes "dynamic routing," wherein data packets are routed using the best routing available for a packet at a particular moment in time, given the current network traffic patterns. This system allows many different communications to be routed simultaneously over the same transmission facilities. In contrast, a circuit-switched telephone network, such as the public switched telephone network (PSTN), establishes dedicated, end-to-end transmission paths. Consequently, the Internet allows network resources to be used more efficiently than circuit-switched networks.

However, the advantages of reduced cost and bandwidth savings by using voice-over-packet networks are associated with quality-of-service (QoS) problems, such as latency, packet loss, and jitter. On the Internet, data packets from the same voice conversation can take very different routes from second to second and are likely to arrive at their destination out of order than originally transmitted, late, or not at all. Further, the data stream is not uniform—data packets carrying the voice conversation can arrive at the destination at irregular intervals, as shown in FIG. 1. If a packet arrives slightly late, the audio device which is ready to play the next frame of audio has nothing to play. This causes a short silent period that makes the voice sound choppy or garbled. Such discontinuity degrades the audio quality and decreases the desirability of using the Internet to conduct voice communications.

To compensate for the irregular arrival intervals of data packets (or jitter) inherent in packet-switched networks, a jitter buffer is provided with the device. A conventional jitter buffer has a fixed size, or depth. The jitter buffer stores, or buffers, an amount of incoming a data packets for a specified amount of time before sending them in a more constant stream, thereby ensuring that there will be data to play and producing a more even flow of data. However, every frame buffered adds latency, or delay, which is especially relevant to voice calls. For example, if the jitter buffer setting is 50 milliseconds (msec) of data, 50 msec of delay is introduced between the time the words are spoken and when they are heard. When added to the latency of the Internet itself, this can rapidly become unacceptable. Typically, people can tolerate delays not exceeding 200 msec to 250 msec before the conversation becomes annoying. FIG. 2 shows a table of examples of the one-way delay budget with typical values. Given that many Internet locations are 100 msec or more (one way) apart, adding 50 msec of jitter buffer latency accounts for a significant fraction of the acceptable delay.

A delicate balance lies between the need to eliminate jitter and the need to reduce latency. Further, the network traffic condition varies continuously. Accordingly, when network traffic is low, the jitter buffer may be too large, thereby introducing unnecessary latency. However, when network load is high, the jitter buffer may be too small such that network perturbations, for example, packet loss and jitter, will cause audible distortion on the voice conversation. In addition, for Internet devices having a fixed jitter buffer depth, when the jitter buffer is too large, the unused memory resources in the system are not available to perform other functions.

Accordingly, it would be desirable to provide a system having jitter buffer adjustment for multimedia applications that addresses the drawbacks of known systems.

SUMMARY OF THE INVENTION

The present invention relates to a system and method for providing jitter buffer adjustment for multimedia applications. The system can be used in packet-switched networks.

In accordance with one aspect of the present invention, the system includes a buffer, a clock, a comparison module, and a buffer depth adjuster. The received data is stored in the buffer, and the clock determines the arrival-time of the data. By comparing the arrival-time and the playback-time of the data, the comparison module determines whether that data arrived on schedule. If the data did not arrive on schedule, the buffer depth adjuster can alter the depth of the buffer.

In accordance with an additional aspect of the present invention, the system includes a buffer, a buffer detector unit, and a buffer depth adjuster. The received data is stored in the buffer, and the buffer detector unit determines whether at least a predefined amount of data is stored in the buffer. If not, the buffer depth adjuster alters the depth of the buffer.

In accordance with a further aspect of the invention, the method comprises the steps of receiving a frame of an input signal at an arrival-time, the frame having a timestamp indicating a playback-time, determining whether the frame arrived late, the frame arriving late if the arrival-time is greater than the playback-time and altering the depth of the multimedia buffer system if the frame arrived late.

The present invention provides advantages of dynamically adjusting the buffer depth depending on the network conditions. Further, the adjustments to the buffer depth maintain the delicate balance between the need to eliminate jitter and the need to reduce latency.

BRIEF DESCRIPTION OF THE DRAWINGS

The invention will now be described in greater detail with reference to the preferred embodiments illustrated in the accompanying drawings, in which like elements bear like reference numerals, and wherein:

FIG. 6 illustrates data stored in the buffer management system of FIG. 5;

DETAILED DESCRIPTION OF THE PREFERRED EMBODIMENTS

Figures 1, 2:
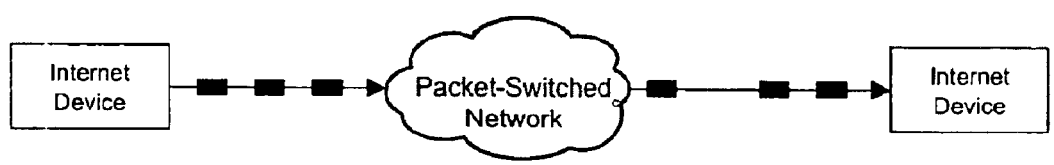
FIG. 1 illustrates data packets sent over a packet-switched network.
FIG. 2 illustrates an example of a one-way delay budget.
Figure 3:
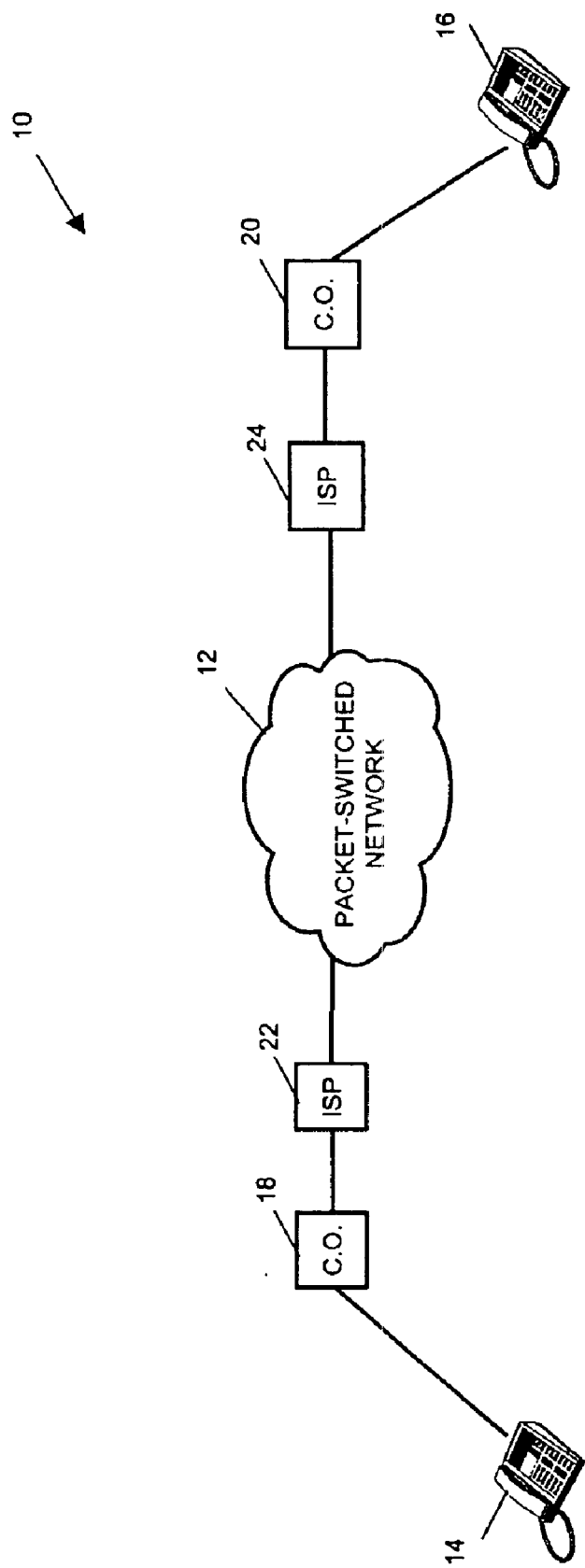
FIG. 3 illustrates an Internet telephone call system.

FIG. 3 illustrates one configuration of an Internet telephone call system 10. The Internet telephone call system 10 transports voice over a packet-switched network 12, such as the Internet, using data packets whereby an Internet subscriber (hereinafter "subscriber" and not shown) having the necessary hardware and software may conduct real-time voice conversations over the Internet 12. The Internet devices 14, 16 forming the Internet telephone call system 10 may include a conventional telephone and an adaptor having Internet telephony enabling hardware and software, e.g., the Komodo Fone™ product available from Komodo Technology, Inc. of Los Gatos, Calif. Alternative Internet devices 14, 16, may provide video and other services. Although the Internet telephone call system 10 is illustrated as including telephonic devices, it will be apparent to persons skilled in the art that the present invention can support multimedia audio-visual applications without departing from the scope of the present invention.

As shown in FIG. 3, the Internet telephone call system 10 includes at least two Internet devices 14, 16, each connecting to an associated central office (CO) 18, 20. Further, each Internet device 14, 16 has an associated Internet Service Provider (ISP) 22, 24 in order to access the Internet 12. The subscriber may cause the Internet device 14, 16 to place a telephone call over the Internet 12, which may experience jitter and latency, problems typical of most digital audio applications.

Figure 4:
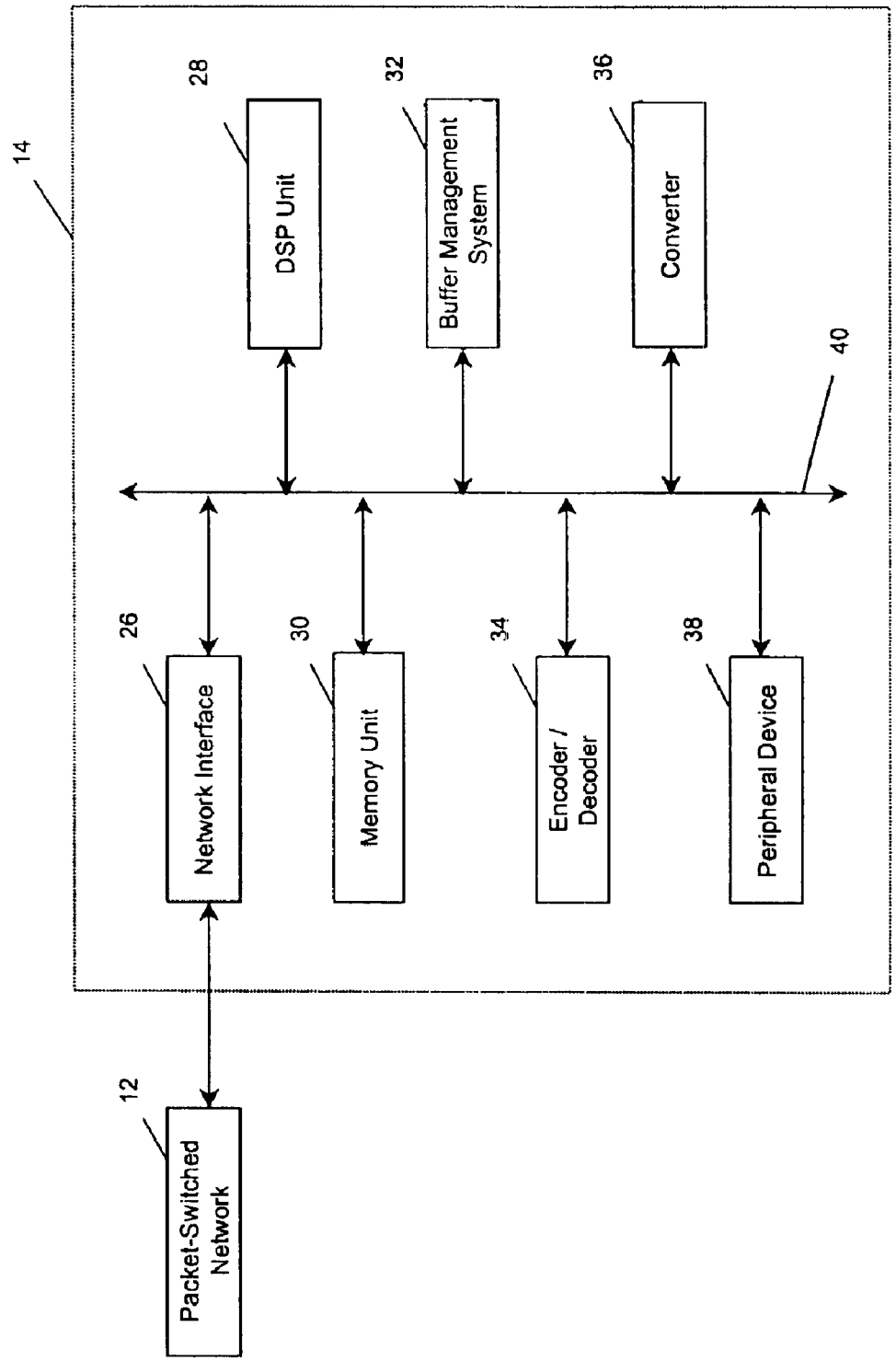
FIG. 4 is a block diagram of an Internet device according to an exemplary embodiment of the present invention.
Figure 5:
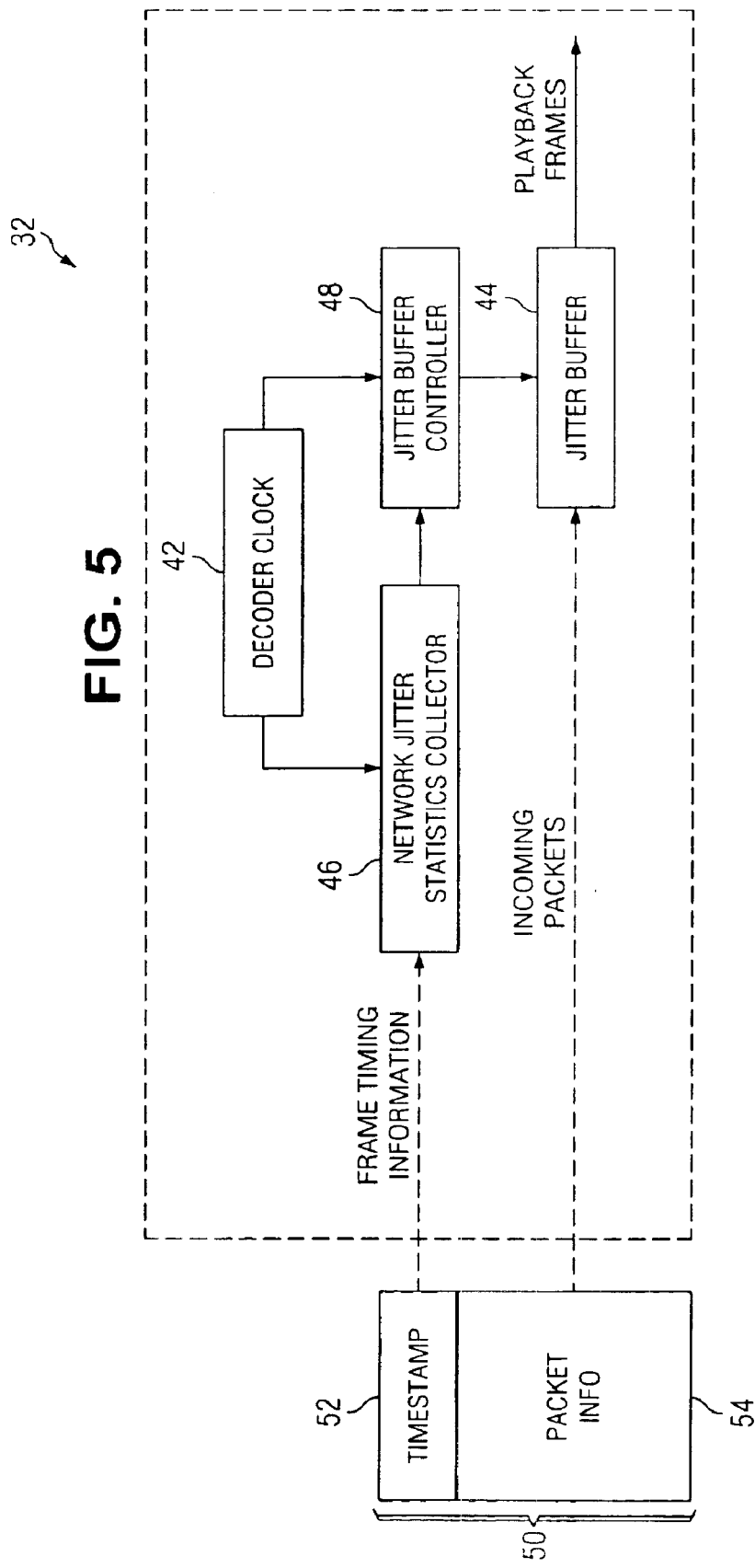
FIG. 5 is a functional block diagram of the buffer management system of the Internet device of FIG. 4 receiving a data frame.

The present invention is a system and method for providing dynamic multimedia jitter buffer adjustment over packet-switched networks. FIGS. 4 and 5 depict components of one embodiment of an Internet device 14 having a jitter buffer. As shown in FIG. 4, the Internet device 14 includes a network interface 26, a digital signal processor unit 28, a memory unit 30, a buffer management system 32, an encoder/decoder 34, a converter 36, and a peripheral device 38. The components can communicate via a system bus 40.

In operation, the network interface 26 allows transmission and reception of data packets, or frames, to and from the Internet device 14. The network interface 26 may include various connectors, for example, RJ11 ports, RJ45 ports, RS-232 ports, and USB.

The digital signal processor unit (DSP unit) 28 receives the incoming digital data from the network interface 26 and provides call processing and voice and/or video processing. The DSP unit 28 and associated logic are supported by voice and/or video processing software and the memory unit 30. The DSP unit 28 includes a digital signal processor and other control processing units. In particular, the DSP unit 28 performs call signaling and control, as well as packetization and depacketization functions.

The buffer management system 32, described in greater detail below, receives and stores an amount of incoming data packets for a specified amount of time before sending them in a more uniform stream to the encoder/decoder 34. The memory unit 30 contains the jitter buffer algorithm (described below in greater detail), as well as stores the timing information of data frames. Then the encoder/decoder 34 performs the compression and decompression functions (codec) on the data packets, thereby reducing the required bandwidth used to carry the packets over the network. Such codec techniques enable audio and video communication while maintaining high quality.

The converter 36 is an analog to digital (A/D) and digital to analog (D/A) converter. Specifically, the converter 36 performs both a digitization function, to process an analog signal to digital format, and the reverse process, to revert the signal back to analog format.

Next, the signals are transmitted to the peripheral device 38 which enables a user to interact with the Internet device 14. For example, the peripheral device 38 may include, among other features, a microphone, a speaker, and/or a visual display means.

FIG. 5 shows the buffer management system 32 including a decoder clock 42, a jitter buffer 44, a network jitter statistics collector 46, and a jitter buffer controller 48. A data frame 50, containing timestamp information 52 and packet information 54, is received at the buffer management system 32 for temporary storage before playback by the peripheral device 38. The timestamp information 52 contains the "playback-time," or the time in which the data frame 50 should be played back. The encoder/decoder of the transmitting Internet device (not shown) provides the playback-time for each data frame before it is sent over the network 12 to the receiving Internet device. In one embodiment, such timestamp information 52 includes a sequence number, designating the Real-Time Protocol (RTP) sequence number of the incoming data frame, and the playback-time.

The decoder clock 42 indicates the arrival-time of the data frame 50 at the buffer management system 32. The jitter buffer 44 stores the packet information 54 for an amount of time which is dynamically adjustable based on the network load. The network jitter statistics collector 46 collects the timestamp information 52 which the jitter buffer controller 48 uses to compare with the arrival-time to determine whether the data frame 50 arrived on schedule. In one embodiment, the playback-time and arrival-time can be stored in the memory unit 30 in tabular form, as illustrated in FIG. 6.

For example, frame 1, having a playback of time 100, was sent at time 0 and arrived at time 100; and frame 2, having a playback of time 130, was sent at time 30 and arrived at time 220. Frame 3, having a playback of time 160, was sent at time 60 and arrived at time 160 while frame 4, having a playback of time 190, was sent at time 90 and arrived at time 190. Then, frame 5, having a playback of time 220, was sent at time 120 and arrived at time 250. Accordingly, the jitter buffer controller 48 would determine that frame 2 arrived late to the buffer management system 32 by 90 milliseconds (msec), and frame 5 arrived late by 30 msec.

After deriving this arrival-time information, the jitter buffer controller 48 calculates the jitter statistics based on the network condition. For example, the jitter statistics include the number of late-arriving data frames, the number of early-arriving data frames, and the amount of time that the data frames arrived late or early. If a predetermined amount of data frames arrived late to the buffer management system 32, the jitter buffer controller 48 can increase the depth of the jitter buffer 44 to accommodate the late frames, as described below in greater detail. The amount of the depth increase can vary and is based on the maximum time that a data frame, within a particular set, arrived late to the buffer management system 32.

In the above example, assuming that the set consists of five data frames (frames 1 through 5) and the predetermined number of allowable late frames is one, since two frames arrived late (frames 2 and 5), the jitter buffer controller 48 will increase the depth of the jitter buffer 44. Here, the jitter buffer depth will increase by 90 msec (the maximum time which a data frame arrived late within that set) if increasing the jitter buffer 44 by 90 msec will not exceed the maximum buffer depth. Then by continuously monitoring and updating the statistics of the network jitter, the jitter buffer controller 48 can dynamically adjust the jitter buffer depth to balance between eliminating jitter and reducing latency. The particular size of the set may vary depending on the amount of monitoring and adjusting of the jitter buffer depth to be performed.

In contrast, if a predetermined number of data frames arrive early, the jitter buffer controller 48 determines whether the depth of the jitter buffer 44 can decrease by an amount to reduce latency added by the jitter buffer while maintaining sufficient buffer depth to remove jitter of subsequently received data frames. The jitter buffer depth is bounded by maximum and minimum values to avoid introducing very long and impractical delay or having a large number of late data frames. For example, the jitter buffer 44 can store between approximately 0 msec and 10000 msec, and preferably between approximately 0 msec and 1000 msec, and more preferably between approximately 0 msec and 500 msec.

Figure 7:
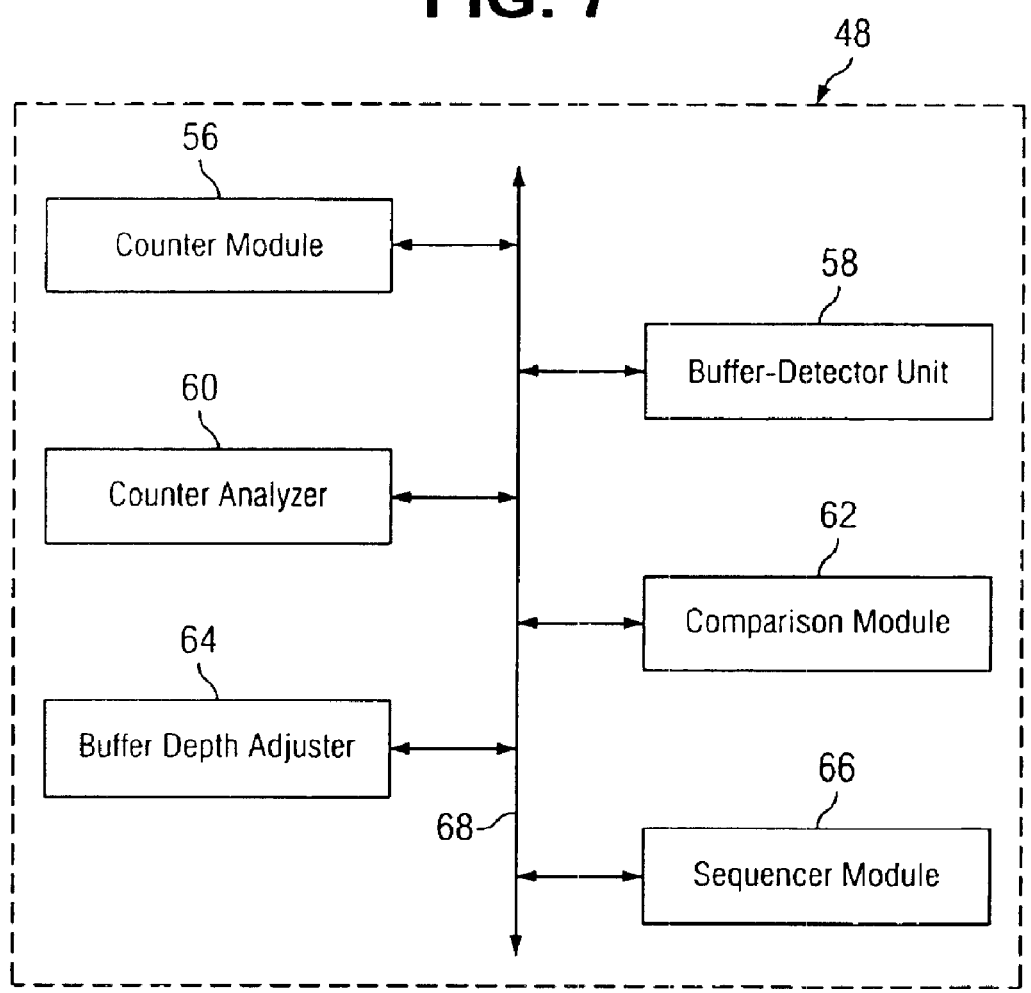
FIG. 7 is a block diagram of the buffer management system of FIG. 5.

As shown in FIG. 7, the jitter buffer controller 48 includes a counter module 56, a buffer-detector unit 58, a counter analyzer 60, a comparison module 62, a buffer depth adjuster 64, and a sequencer module 66. Further, each component communicates with other components using a system bus 68.

The counter module 56 generates and controls the counters used for tracking input and output to and from the jitter buffer controller 48. Among the counters that the counter module 56 controls are a $COUNTER_{BUFFER}$ 70, a $COUNTER_{FRAME}$ 72, a $COUNTER_{LATE}$ 74, and a $COUNTER_{EARLY}$ 76. The $COUNTER_{BUFFER}$ 70 represents the number of data frames stored in the jitter buffer 44, and the $COUNTER_{FRAME}$ 72 tracks the number of data frames processed by the buffer management system 32. The $COUNTER_{LATE}$ 74 tracks the number of late data frames in a set, while $COUNTER_{EARLY}$ 76 tracks the number of early data frames in a set.

The buffer-detector unit 58 and counter analyzer 60 read the $COUNTER_{BUFFER}$ 70, $COUNTER_{FRAME}$ 72, $COUNTER_{LATE}$ 74, and $COUNTER_{EARLY}$ 76 values and determine the condition of the buffer management system 32. Specifically, the buffer-detector unit 58 uses the $COUNTER_{BUFFER}$ 70 to determine the amount of storage available in the buffer, while the counter analyzer 60 uses the $COUNTER_{FRAME}$ 72 to determine whether the data frame 50 is the last frame of the set. For example, if a set has sixteen data frames, then the seventeenth received data frame will be considered the first frame of the subsequent set. Moreover, the counter analyzer 60 uses the $COUNTER_{LATE}$ 74 to determine the number of late data frames in the set and the $COUNTER_{EARLY}$ 76 to determine the number of early data frames in the set.

The comparison module 62 reads the playback-time for the data frame 50 and compares it with the arrival-time, as indicated by the decoder clock 42, to determine whether the data frame arrived on schedule. When the arrival-time is greater than the playback-time, the data frame is determined to be late. In contrast, if the arrival-time is less than the playback-time, then the data frame is determined to be early. With this information, the comparison module 62 can calculate jitter statistics on the delays between playback-times and arrival-times on a frame-by-frame basis. The jitter statistics indicate whether the data frames arrive in acceptable times, thereby producing acceptable voice quality. Accordingly, the buffer depth adjuster 64 increases or decreases the jitter buffer depth by an amount of time or number of frames based on the determinations made by the buffer-detector unit 58, the counter analyzer 60, and the comparison module 62.

The sequencer module 66 is provided to determine whether the received data frames are in the correct playback order. Here, the sequencer module 66 can use the playback-time read by the comparison module 62 to detect whether the data frames stored in the jitter buffer 44 are out of sequence. In an alternative embodiment, if the Internet device 14 supports RTP, the sequencer module 66 uses the RTP sequence number to make this determination.

Figure 8A:
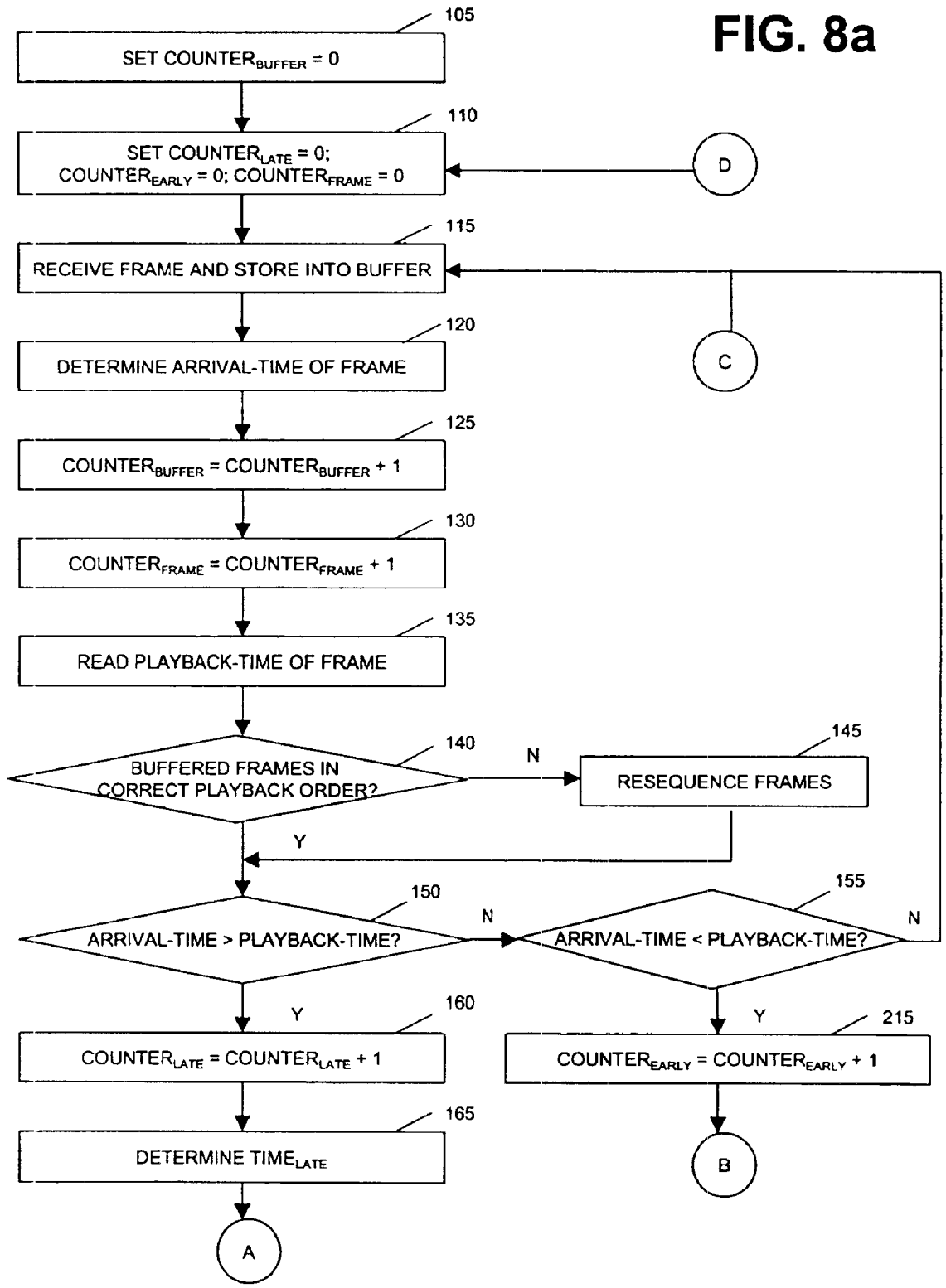
FIGS. 8a–8c are flowcharts showing a first embodiment of a method of adjusting the jitter buffer depth according to one embodiment of the present invention.
Figure 8B:
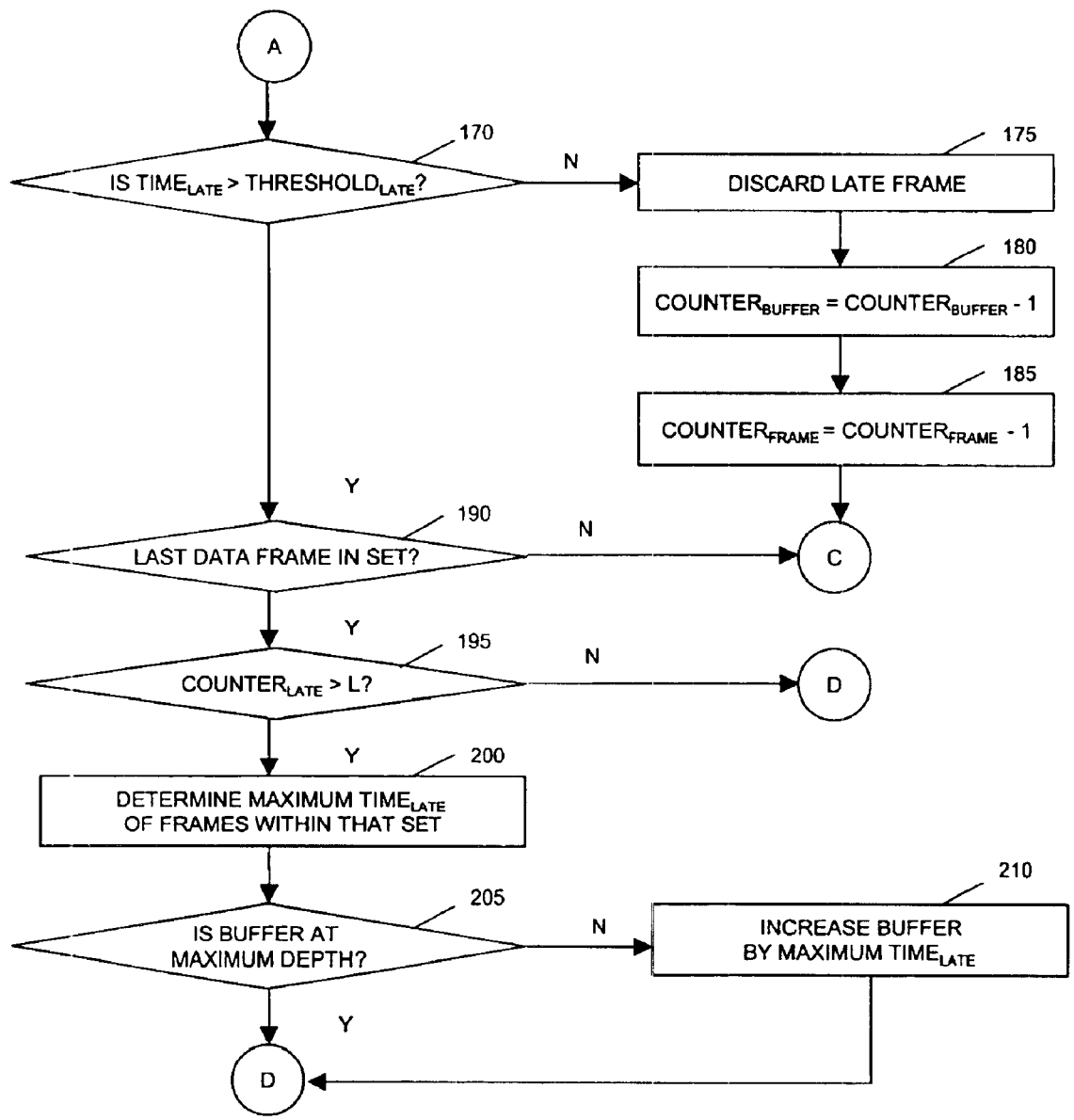
Figure 8C:
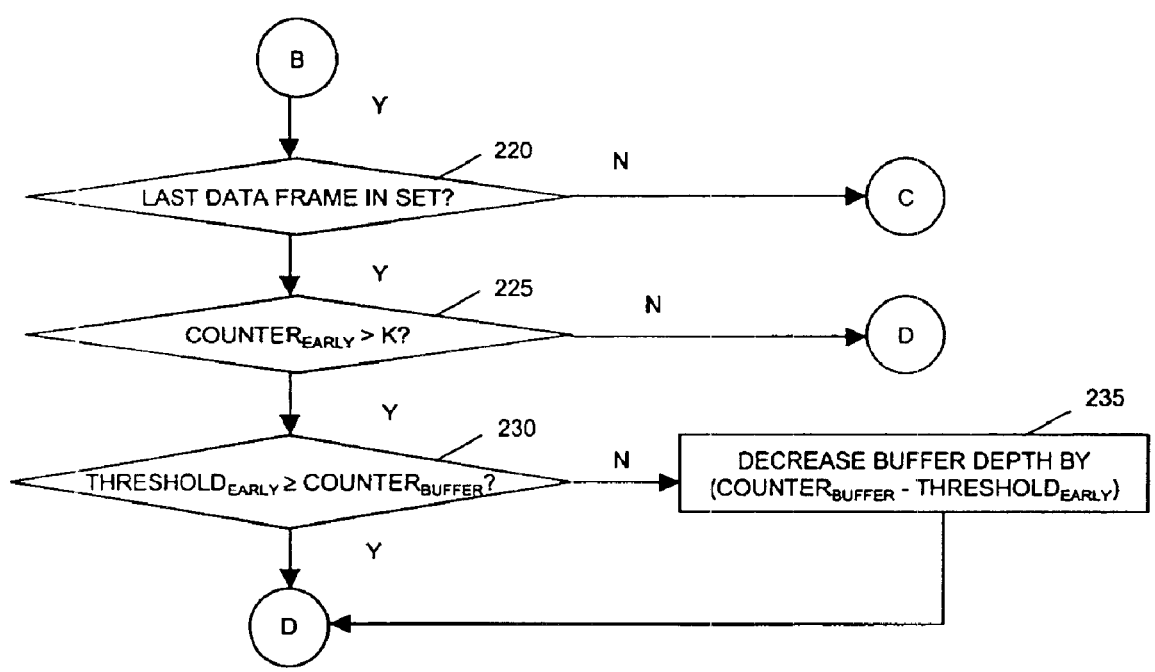

FIGS. 8a through 8c show the steps of an exemplary embodiment of a jitter buffer adjustment scheme to dynamically adjust the jitter buffer depth of an Internet device, as it relates to FIG. 4.

The block 105 indicates that the counter module 56 sets the $COUNTER_{BUFFER}$ 70 to zero. At block 110, the counter module 56 sets the $COUNTER_{FRAME}$ 72 to zero, the $COUNTER_{LATE}$ 74 to zero, and the $COUNTER_{EARLY}$ 76 to zero. Then at block 115, a data frame 50 arrives at the buffer management system 32 and is stored in the jitter buffer 44. At block 120, the decoder clock 42 registers the arrival-time of the data frame 50 in the memory unit 30. Having received and stored the data frame 50, the process flows to block 125 and then block 130 where the $COUNTER_{BUFFER}$ and the $COUNTER_{FRAME}$ increase their counts to reflect the stored data frame, respectively.

Next at block 135, the network jitter statistics collector 46 collects the timestamp information 52 which contains the playback-time for the data frame 50. Then the comparison module 62 of the jitter buffer controller 48 reads the timestamp information 52. At decision block 140, the sequencer module 66 uses the playback-time to detect whether the received data frame 50 is out of sequence, as compared with any other data frames stored in the jitter buffer 44. In another embodiment of the invention, the sequencer module 66 makes this determination using the RTP sequence number.

If the answer to the decision block 140 is no, then the process moves to block 145 where the sequencer module 66 transmits a command to arrange the data frames in sequential order so that the data frames can be played back in order by the peripheral device 38. Otherwise, the process flows to decision block 150 where the comparison module 62 compares the arrival-time, indicated by the decoder clock 42, with the playback-time and determines whether the data frame 50 arrived on schedule. If the arrival-time is greater than the playback-time, time, then the data frame 50 is determined to be late. In contrast, if the arrival-time is less than the playback-time, as determined at decision block 155, then the data frame 50 is determined to be early (discussed in greater detail below).

In response to determination of a late data frame 50, the counter module 56 increases the $COUNTER_{LATE}$ 74 to reflect the late frame, as shown at block 160. Next at block 165, the comparison module 62 determines the amount of time that the data frame 50 arrived late ($TIME_{LATE}$). It is within the scope of the present invention that the comparison module 62 calculates the amount of time depending on the codec technique used. For example, the audio codec of G.723.1 uses 30 msec per data frame, and G.729.A requires 10 msec/frame, while in G.711$\mu$ or G.711A, the amount of time per data frame varies. In another embodiment of the invention, the comparison module 62 will determine the number of frames in which the data frame 50 arrived late.

Then at decision block 170, after having determined the value of $TIME_{LATE}$, the comparison module 62 compares $TIME_{LATE}$ with a threshold value ($THRESHOLD_{LATE}$) which is the maximum allowable lateness of a data frame 50. Next, if $TIME_{LATE}$ exceeds $THRESHOLD_{LATE}$ the process moves to block 175 wherein the buffer management system 32 discards that data frame 50. Specifically, here the arrival-time of the data frame 50 appears excessively late, and rather than increasing the jitter buffer depth to introduce very long and impractical delay, the buffer management system 32 discards the late data frame and decreases $COUNTER_{BUFFER}$ 70 and the $COUNTER_{FRAME}$ 72 counts, at blocks 180 and 185, respectively, to reflect the discarded data frame. Then the buffer management system 32 processes the next received data frame, the flow looping back to block 115. An occasional discarded data frame is typically unnoticeable to the user. However, when several successive frames are excessively late, the buffer management system 32 may not discard all frames within the late group, but rather the management system compensates for the late frames. Such compensation techniques may include, but is not limited to, interpolation of late-arriving data frames, not discarding sequential late frames but only every $n^{th}$ frame, or repeating frames.

If the answer to decision block 170 is yes, the process moves to decision block 190 where it is determined whether the data frame 50 is the last frame of the set. In performing this determination, the counter analyzer 60 ascertains whether $COUNTER_{FRAME}$ 72 is greater than a predetermined value, "SET." This predetermined value, "SET," indicates the number of received data frames that constitute the set. Analyzing jitter statistics of a set, rather than for each individual data frame, allows the buffer management system 32 to perform buffer depth adjustments on manageable sized groupings of data frames. Further, in one embodiment of the invention, the value of the SET is variable, thereby resulting in more or less monitoring and adjustment of the jitter buffer depth.

Next at decision block 195, it is determined whether the number of late data frames exceed a predetermined value. For example, the counter analyzer 60 ascertains whether the $COUNTER_{LATE}$ 74 is greater than the predetermined value "L." If so, the process moves to block 200. Otherwise, the scheme loops back to block 110 where the buffer management system 32 resets certain counters to zero and processes the next received data frame, at block 115. By having the $COUNTER_{LATE}$ value exceed the predetermined value "L," the occasional or random late arriving data frame will not cause the buffer management system 32 to adjust the jitter buffer depth.

At block 200, the comparison module 62 determines the maximum amount of time a data frame arrived late within that data set. Then at decision block 205, it is determined whether the jitter buffer 44 is set at its maximum depth. If not, the buffer depth adjuster 64 of the jitter buffer controller 48 transmits a signal which causes the jitter buffer depth to increase by the maximum $TIME_{LATE}$ for that particular data set, as shown at block 210. For example, the inter-arrival time of successive data frames should be 30 msec, and the buffer depth adjuster 64 transmits a signal which causes the decoder clock 42 to decrease by 60 msec (maximum $TIME_{LATE}$). As such, the decoder clock 42 would indicate data frames that arrived at times 100, 190, and 220 had arrived at times (100-maximum $TIME_{LATE}$), (190-maximum $TIME_{LATE}$), and (220-maximum $TIME_{LATE}$). Accordingly, the comparison module 62 would determine that the first data frame arrived 60 msec early while the subsequently received two data frames arrived on schedule, thereby no data frames are discarded. Thus, adjusting the decoder clock 42 by the decrement, maximum $TIME_{LATE}$, achieves an increased jitter buffer depth.

If the answer to decision block 205 is yes, then the process automatically loops back to block 110 where the $COUNTER_{LATE}$, $COUNTER_{EARLY}$, and $COUNTER_{FRAME}$ are reset, and the buffer management system 32 processes the next received data frame at block 115.

Returning to decision block 155, if the data frame 50 is determined to have arrived early, then the counter module 56 increases the $COUNTER_{EARLY}$ 76 to reflect the early frame, as shown at block 215. Next at decision block 220, the counter analyzer 60 determines whether $COUNTER_{FRAME}$ 72 is greater than the predetermined value, "SET." As discussed, this predetermined value, "SET," indicates the number of received data frames that constituted the set. If the answer to decision block 220 is no, the scheme loops back to block 115 where the buffer management system 32 processes the next received data frame.

Otherwise, the scheme proceeds to decision block 225 where it is determined whether the number of early data frames exceed a predetermined value. For example, the counter analyzer 60 ascertains whether the $COUNTER_{EARLY}$ 76 is greater than the predetermined value "K." If not, the process loops back to block 110. If the answer to decision block 225 is yes, the process moves to decision block 230. By having the $COUNTER_{EARLY}$ 76 exceed the predetermined value "K," the occasional or random early arriving data frame will not cause the buffer management system 32 to adjust the jitter buffer depth.

At decision block 230, it is determined whether the depth of the jitter buffer 44 can decrease by an amount to reduce unnecessary latency added by the jitter buffer. Here, the counter analyzer 60 reads the COUNTER$_{BUFFER}$ value 70, which the comparison module 62 compares with a threshold value (THRESHOLD$_{EARLY}$). THRESHOLD$_{EARLY}$ is the minimum allowable number of data frames stored in the jitter buffer 44 to ensure that there will be data to play by the peripheral device 38.

Next, if THRESHOLD$_{EARLY}$ is less than COUNTER$_{BUFFER}$, the process moves to block 235 where the buffer-detector unit 58 transmits a signal to cause the buffer depth adjuster 64 to decrease the jitter buffer depth by an amount, COUNTER$_{BUFFER}$ minus THRESHOLD$_{EARLY}$. For example, the jitter buffer 44 is storing 60 msec of data frames, but the buffer depth allows for 150 msec. Further, several consecutive data frames are being received early. Based on these conditions, the buffer-detector unit 58 transmits a signal to cause the buffer depth adjuster 64 to decrease the jitter buffer 44 by 90 msec. Otherwise, the scheme loops back to block 110 where the COUNTER$_{LATE}$, COUNTER$_{EARLY}$, and COUNTER$_{FRAME}$ are reset, and the buffer management system 32 processes the next received data frame at block 115.

However, if the arrival-time is neither greater than nor less than the playback-time (decision blocks 150 and 155, respectively), then the data frame 50 arrived on schedule. Accordingly, the jitter buffer depth will not be adjusted, the scheme looping back to block 115 to process the next received data frame.

In an alternative embodiment, the jitter buffer adjustment scheme adjusts the jitter buffer depth depending on the amount of data frames stored in the jitter buffer 44. Here, the buffer detector unit 58 determines, for the previous set of data frames, whether the jitter buffer 44 had data available to transmit to the decoder 34. Preferably, the jitter buffer 44 has sufficient data frames stored to send a uniform stream to the decoder 34. If not, the buffer depth adjuster 64 transmits a signal which causes the jitter buffer 44 to increase in depth by a predefined amount. Then by continuously monitoring the amount of data frames stored in the jitter buffer 44 and whether data frames are available to provide a uniform stream of data, the jitter buffer controller 48 dynamically adjusts the jitter buffer depth to balance between jitter buffer and reducing latency.

The present invention concerns a system and method for providing dynamic multimedia jitter buffer over packet-switched networks. While the invention has been described in detail with reference to the preferred embodiments thereof, it will be apparent to one skilled in the art that various changes and modifications can be made and equivalents employed without departing from the present invention.

What is claimed is:

1. A system for storing at least one frame of an input signal for an amount of time before transmitting the at least one frame, the system comprising:
   a buffer for storing a frame of an input signal, the buffer having a depth which is adjustable;
   a clock for indicating an arrival-time of the frame received at the buffer, the frame having a timestamp denoting a playback-time;
   a comparison module for comparing the arrival-time with the playback-time for determining whether the frame arrived on schedule, the comparison module operable to determine an amount of time between the arrival-time and the playback-time if the frame did not arrive on schedule; and
   a buffer depth adjuster for altering the depth of the buffer responsive to the comparison module determining the frame did not arrive on schedule, wherein the depth of said buffer is altered based on the amount of time said frame did not arrive on schedule.

2. The system of claim 1, wherein if the frame arrived late, the comparison module determines an amount of time said frame arrived late.

3. The system of claim 2, further comprising:
   a late-counter responsive to the comparison module, the late-counter stores a count of frames arriving late.

4. The system of claim 3, wherein the buffer depth adjuster responsive to the late-counter exceeding a predetermined value, said buffer depth adjuster causing the depth of said buffer to increase.

5. The system of claim 4, wherein the depth of the buffer increases by the amount of time determined by the comparison module, and said amount of time corresponding to a maximum amount of time which a frame within a set arrived late.

6. The system of claim 5, wherein a length of the set is variable.

7. The system of claim 5, wherein the depth of the buffer increases by adjusting the clock by the maximum amount of time which the frame within the set arrived late.

8. The system of claim 1, wherein the depth of the buffer does not increase above a maximum predefined value.

9. The system of claim 1, wherein if the frame arrived early, the comparison module determining an amount of time said frame arrived early.

10. The system of claim 9, further comprising:
    an early-counter responsive to the comparison module, the early-counter stores a count of frames arriving early.

11. The system of claim 10, wherein the buffer depth adjuster responsive to the early-counter exceeding a predetermined value, said buffer depth adjuster causing the depth of said buffer to decrease.

12. The system of claim 11, further comprising:
    a buffer-counter for storing a count of frames stored in the buffer; and
    a buffer detector unit responsive to the early-counter exceeding a predetermined value, the buffer detector unit causing the buffer depth adjuster to decrease the depth of the buffer by an amount of time dependent on the buffer-counter.

13. The system of claim 12, wherein the depth of the buffer decreases by adjusting the clock by the amount dependent on the buffer-counter.

14. The system of claim 1, wherein the depth of the buffer does not decrease below a minimum predefined value.

15. The system of claim 1, further comprising:
    a sequencer module for arranging the frames stored in the buffer in an order for playback.

16. A method for increasing a depth of a multimedia buffer system, the method comprising the steps of:
    receiving a frame of an input signal at an arrival-time, the frame having a timestamp indicating a playback-time;
    determining whether the frame arrived late, the frame arriving late if the arrival-time is greater than the playback-time;
    determining an amount of time the frame arrived late if the arrival-time is greater than the playback-time;
    determining whether the multimedia buffer system is at a maximum depth; and altering the depth of the multimedia buffer system if the frame arrived late and the multimedia buffer system is not at the maximum depth.

17. The method of claim 16, wherein depth of the multimedia buffer system is altered to increase by a maximum amount of time which a frame within a set arrived late.

18. The method of claim 17, wherein the length of the set is variable.

19. The method of claim 16, further comprising the step of:
providing a late-counter representing an amount of frames arriving late;
prior to performing the step of altering the depth of the multimedia buffer system, determining whether the late-counter exceeds a predetermined value; and
performing said step of altering the depth of the multimedia buffer system if the late-counter exceeds the predetermined value.

20. A method for decreasing a depth of a multimedia buffer system, the method comprising the steps of:
receiving a frame of an input signal at an arrival-time, the frame having a timestamp indicating a playback-time;
determining whether the frame arrived early, the frame arriving early if the arrival-time is less than the playback-time;
determining an amount of time the frame arrived early if the arrival-time is less than the playback-time; and
determining whether the multimedia buffer system is at a minimum depth; and
altering the depth of the multimedia buffer system if the frame arrived early and the multimedia buffer system is not at the minimum depth.

21. The method of claim 20, further comprising the steps of:
providing an early-counter representing an amount of frames arriving early;
prior to performing the step of altering the depth of the multimedia buffer system, determining whether the early-counter exceeds a predetermined value; and
performing said step of altering the depth of the multimedia buffer system if the early-counter exceeds the predetermined value.

22. The method of claim 20, further comprising the step of:
determining an amount of frames stored in the multimedia buffer system.

23. The method of claim 22, wherein the depth of the multimedia buffer system is decreased by an amount dependent on the amount of frames stored in the multimedia buffer system.

24. A computer program for altering a depth of a buffer, the computer program operable to:
receive a frame of an input signal at an arrival-time, the frame having a timestamp indicating a playback-time;
determine whether the frame arrived on schedule, the frame arriving on schedule if the arrival-time matches the playback-time;
determine an amount of time the frame arrived late based on an amount of time that the arrival-time exceeds the playback-time if the frame did not arrive on schedule; and
altering the depth of the buffer if the frame did not arrive on schedule.

25. The computer program of claim 24, further operable to alter the depth of the buffer by increasing the depth by a maximum amount of time which a frame within a set arrived late.

26. The computer program of claim 25, wherein the length of the set is variable.

27. The computer program of claim 24, wherein the computer program is further operable to adjust a late count if the arrival-time exceeds the playback-time and wherein the computer program is further operable to alter the depth by:
determining whether the late count exceeds a predetermined value; and
altering the depth of the buffer if the late count exceeds the predetermined value.

28. The computer program of claim 24, wherein the computer program is operable to alter the depth by:
determining whether the buffer is at a maximum depth; and
altering the depth of the buffer if the depth is less than the maximum depth.

29. The computer program of claim 24, wherein the computer program is operable to determine an amount of time by determining an amount of time the frame arrived early based on an amount of time the playback-time exceeds the arrival-time.

30. The computer program of claim 29, wherein the computer program is further operable to adjust an early count if the playback-time exceeds the arrival-time and wherein the computer program is further operable to alter the depth by:
determining whether the early count exceeds a predetermined value; and
altering the depth of the buffer if the early count exceeds the predetermined value.

31. The computer program of claim 29, wherein the computer program is further operable to:
determine an amount of frames stored in the buffer.

32. The computer program of claim 31, wherein the computer program is further operable to decrease the depth of the buffer by an amount based on the amount of frames stored in the buffer.

33. The computer program of claim 29, wherein the computer program is further operable to alter the depth by:
determining whether the depth of the buffer is greater than a predetermined minimum; and
altering the depth of the buffer if the depth is greater than the predetermined minimum.

34. A system for increasing a depth of a buffer, the system comprising:
means for receiving a frame of an input signal at an arrival-time, the frame having a timestamp indicating a playback-time;
means for determining whether the frame arrived late, the frame arriving late if the arrival-time is greater than the playback-time;
means for maintaining a late count representing a number of frames arriving late;
means for determining whether the late-counter exceeds a predetermined value; and
means for altering the depth of the buffer if the frame arrived late and the late-counter exceeds the predetermined value.

35. A system for decreasing a depth of a buffer, the system comprising:
  means for receiving a frame of an input signal at an arrival-time, the frame having a timestamp indicating a playback-time;
  means for determining whether the frame arrived early, the frame arriving early if the arrival-time is less than the playback-time;
  means for maintaining an early count representing the number of frames arriving early;
  means for determining whether the early count exceeds a predetermined value; and
  means for altering the depth of the buffer if the frame arrived early and the early count exceeds the predetermined value.

* * * * *